S. G. GEORGE.
THRESHING MACHINE.
APPLICATION FILED MAR. 26, 1913.

1,110,768. Patented Sept. 15, 1914.

WITNESSES
F. E. Barry
C. E. Trainor

INVENTOR
SAMUEL G. GEORGE,
BY Munn & Co.
ATTORNEYS

UNITED STATES PATENT OFFICE.

SAMUEL G. GEORGE, OF CONRAD, MONTANA.

THRESHING-MACHINE.

1,110,768. Specification of Letters Patent. Patented Sept. 15, 1914.

Original application filed November 4, 1912, Serial No. 729,198. Divided and this application filed March 26, 1913. Serial No. 756,996.

*To all whom it may concern:*

Be it known that I, SAMUEL G. GEORGE, a citizen of the United States, and a resident of Conrad, in the county of Teton and State of Montana, have made new and useful Improvements in Threshing-Machines, of which the following is a specification.

My invention is an improvement in threshing machines, and has for its object to provide in a machine of the character specified, a means for dislodging the grain from the straw, so arranged that the grain will be twice acted upon, and wherein means is provided for adjusting the said dislodging means to provide for different conditions, and wherein there will result economy of first cost, upkeep, and the greatest possible amount of grain will be saved.

The present application is a division of my co-pending application, Serial No. 729,198, filed November 4, 1912.

Figure 1:
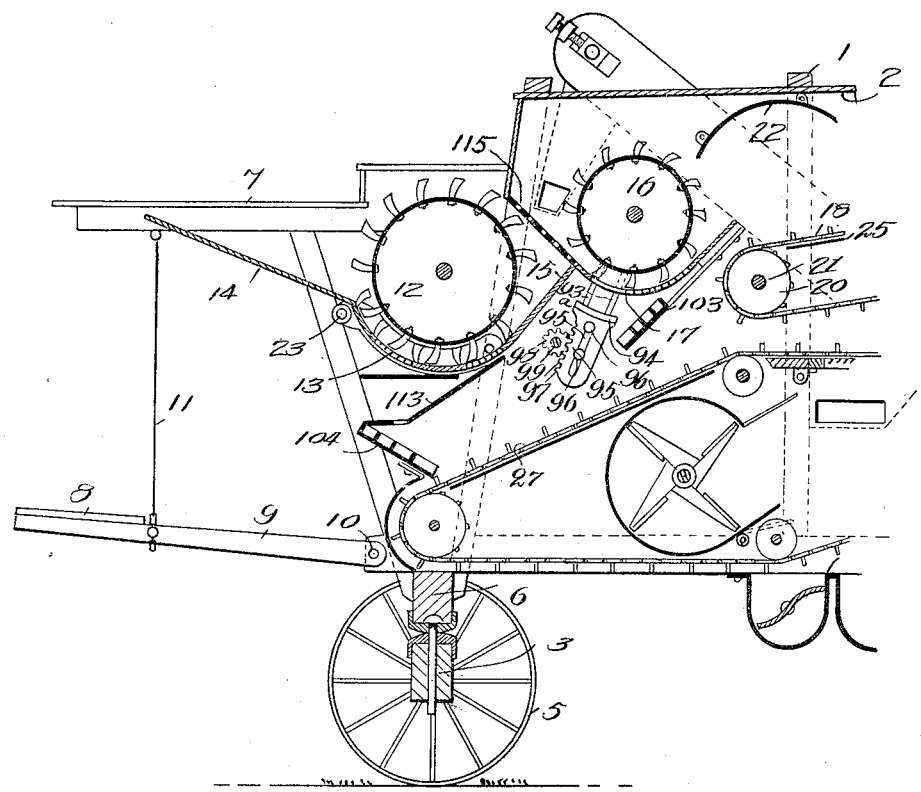
Figure 2:
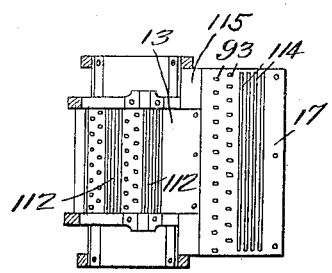

In the drawings: Figure 1 is a central longitudinal section of a threshing machine constructed in accordance with the invention; and, Fig. 2 is a reduced top plan view of the concaves.

The present embodiment of the invention is shown in connection with a threshing machine comprising a frame 1, and a housing 2 for inclosing the frame, the frame and housing being supported by front and rear axles 3, the former only being shown and designated by the reference numeral 3, each axle having wheels 5 journaled on the ends thereof. The front axle 3 is pivoted to a bolster 6, secured to the frame and a feed board or table 7 is arranged at the front of the frame, above the foot board 8. The foot board 8 is secured at the outer ends of arms 9, hinged to the frame at 10, the arms being suspended from the feed table by rods or wires 11. A cylinder 12 is journaled transversely of the frame, at the inner end of the feed table, and a concave 13 is supported below the cylinder, both cylinder and concave having the usual teeth. An inclined plate 14 is arranged in front of the concave, the lower end of the plate contacting with the forward edge of the concave, and a second plate 15 inclined in the opposite direction to plate 14 is arranged at the rear of the concave. A second cylinder 16, of smaller diameter than cylinder 12 is arranged behind cylinder 12, and a concave 17 is supported below the cylinder. The front edge of the concave abuts against the rear end of plate 15.

The rear edge of concave 17 is above the forward and lower end of an endless conveyer 18 supported on rollers or wheels 20 on shafts 21, journaled in the frame. A hood 22, arc-shaped in cross section is arranged above and behind cylinder 16, for deflecting the grain onto the conveyer, and a plate 25 is arranged below the upper run of the said conveyer, at the front end thereof.

The concave 17 is smaller than the concave 13, and the said concave 17 has two rows of teeth 93 which extend perpendicularly to the concave, and are capable of adjustment toward and from the cylinder 16. The teeth 93 are mounted on a transversely concave plate 94, having its concave side upward. The plate 94 has rearwardly extending arms 95 at its ends, and each arm is longitudinally slotted at $95^a$. Headed pins 96 are arranged on the frame for engaging the slots $95^a$, a pair of pins for each slot, and the forward edge of each arm is toothed, as indicated at 97. A pinion 98 engages the teeth of each arm, and the pinions are on the ends of a shaft 99. The shaft 99 is oscillated by any suitable mechanism to oscillate the pinion 98. It will be evident that when the shaft is rotated, the pinions will move the arms in one or the other direction, to project the teeth to a greater or less extent through the concave.

The cylinder 16 is a beater rather than a cylinder. A spreading plate 103 is arranged below concave 17, in inclined position, the said plate inclining forwardly toward its lower end. A similar plate 104 is arranged below the cylinder 12, the said plate inclining downwardly toward its rear end, and each of the plates 103—104 is provided with deflecting ribs, as shown, for evenly distributing the grain on the conveyer 27 arranged below the cylinders, a portion only thereof being shown.

The concave 13, as shown more particularly in Fig. 2, is provided with grates 112, two grates being provided to permit the threshed grain to flow from the concave into the hopper 113, the said hopper being directly below the concave. The rear end of the hopper extends far enough rearwardly to receive the grain falling through the rearmost grate, so that all of the grain that is beaten out by the first cylinder passes downwardly through the grates to the hopper. The concave 17 is also provided with a grate 114, directly above the spreading plate 103, and the grain beaten from the heads by the second cylinder passes through the grate 114 of the concave 17, on to the spreading plate 103, from which it is delivered to the conveyer 27.

The concave 13 is hinged at its rear edge, as indicated at 23, while the front edge is held in the position shown in Fig. 1. With this arrangement, the concave may be lowered for cleaning or the like.

In operation, the straw is fed to the machine in the usual manner, and is first acted upon by the cylinder 12 and the concave 13 in the usual manner. The grain beaten out by the cylinder and the concave falls through the grating of the concave on to the distributing plate 104, and by the said plate the grain is distributed on the carrier 27. The straw passes from the cylinder 12 to the cylinder 16, and the said cylinder 16 coöperates with the concave 17 to complete the beating out of the grain.

It will be noted that on account of the difference in length between the casings for the cylinders 12 and 16, some mechanism is necessary to bridge the space between the adjacent ends of the said casings, and plates 115 are arranged at such points, one of the plates being shown in edge view in Fig. 1.

In the ordinary threshing machine, the grain to be threshed is first passed through the cylinder, and a large portion of the grain is not dislodged from the husks. This grain passes through the machine and by way of the elevator to the cylinder a second time where it is re-threshed. On account of the failure to thoroughly dislodge the grain by the single cylinder construction, vibrating or shaking screens are necessary. The shock and jar from the vibrating and shaking screens soon tears a threshing machine to pieces. It is essential with the ordinary threshing machine to thoroughly block the wheels and to brace the machine against vibration. In spite of the bracing and the blocking of the wheels, there is a continual vibration of the machine when it is running. In the use of two cylinders however, one arranged behind the other, the shaking screens may be omitted, and the grain may be threshed or separated by moving the grain over fixed screens. Instead of passing the unthreshed grain through the cylinder a second time as with the ordinary constructions, the present construction provides two cylinders, one in rear of the other, the second cylinder performing the function that in the ordinary machine is performed by the first cylinder. Thus, the second cylinder relieves the first cylinder of a large portion of its double work. In addition, the two cylinders will entirely remove the grain from the hulls, and there is no necessity for shaking or vibrating screens or rattlerakes and the like, used in the ordinary machine. The two cylinders thoroughly separate all of the grain from the hulls at a single process and prevent absolutely the "slugging" (or slowing down because of overcrowding the first cylinder with un-threshed grain) permitting the single cylinder to take the bunches caused by "slugging" and completely threshing them. It is a fact that in a single cylinder machine, the first cylinder is very frequently almost stopped by the bunches of un-threshed grain, and in addition, such bunches very frequently are carried to the straw pile; also they contain a large amount of un-threshed grain. The double cylinder construction, operating in connection with the improvement, forming the subject-matter of my prior application, Serial No. 729,198, forms a perfectly acting machine, and the use of the double cylinders permits the above-mentioned improvement to complete the separation of the grain.

I claim:

1. In a threshing machine provided with separating mechanism and with an elevator for lifting the unthreshed grain from the separating mechanism, a pair of cylinders arranged with their axes parallel and one in rear of the other, the rear cylinder being of greater length than the first cylinder, and the first cylinder delivering directly to the second cylinder, and a concave coöperating with each cylinder, the elevator delivering to the second cylinder, the first cylinder being of greater diameter than the second cylinder.

2. In a threshing machine provided with separating mechanism and with an elevator for lifting the unthreshed grain from the separating mechanism, a pair of cylinders arranged with their axes parallel and one in rear of the other, the rear cylinder being of greater length than the first cylinder, and the first cylinder delivering directly to the second cylinder, and concave coöperating with each cylinder, the elevator delivering to the second cylinder.

3. In a threshing machine, a cylinder, a concave coöperating therewith, a second cylinder arranged behind the first cylinder and at a higher level, said second cylinder being of greater length than the first cylinder, a concave coöperating with the second cylinder, said first-named concave having alternately arranged longitudinally extending series of teeth and gratings, the second concave having longitudinally extending alternate series of teeth and gratings, said teeth being adjustable toward and from the cylinder.

4. In a threshing machine, a plurality of cylinders arranged one behind the other and with their axes parallel, the front cylinder delivering directly to the rear cylinder, said rear cylinder being of greater length than the first cylinder.

SAMUEL G. GEORGE.

Witnesses:
R. FERGUSON,
C. M. PARSONS.

Copies of this patent may be obtained for five cents each, by addressing the "Commissioner of Patents, Washington, D. C."